(12) United States Patent
Deegan et al.

(10) Patent No.: US 9,441,284 B2
(45) Date of Patent: Sep. 13, 2016

(54) PRECIOUS METAL RECOVERY

(71) Applicant: TETRONICS (INTERNATIONAL) LIMITED, Swindon (GB)

(72) Inventors: David Deegan, Bampton (GB); Shashini Premathilaka, Emersons Green (GB); Saeed Ismail, Swindon (GB)

(73) Assignee: Tetronics (International) Limited, Swindon (GB)

( * ) Notice: Subject to any disclaimer, the term of this patent is extended or adjusted under 35 U.S.C. 154(b) by 0 days.

(21) Appl. No.: 14/784,534

(22) PCT Filed: Apr. 16, 2014

(86) PCT No.: PCT/GB2014/051197
§ 371 (c)(1),
(2) Date: Oct. 14, 2015

(87) PCT Pub. No.: WO2014/170676
PCT Pub. Date: Oct. 23, 2014

(65) Prior Publication Data
US 2016/0060727 A1 Mar. 3, 2016

(30) Foreign Application Priority Data

Apr. 17, 2013 (GB) .................................. 1306976.0

(51) Int. Cl.
*C22B 11/02* (2006.01)
*B01D 46/00* (2006.01)
(Continued)

(52) U.S. Cl.
CPC ........... *C22B 11/00* (2013.01); *B01D 46/0036* (2013.01); *B01D 53/64* (2013.01); *C22B 7/02* (2013.01); *C22B 11/021* (2013.01);*C22B11/023* (2013.01); *C22B 11/025* (2013.01); *C22B 11/026* (2013.01); *Y02P 10/214* (2015.11)

(58) Field of Classification Search
CPC . C22B 11/021; C22B 11/023; C22B 11/025; C22B 11/026; C22B 7/02; B01D 46/0036; B01D 53/64; Y02P 10/214
See application file for complete search history.

(56) References Cited

U.S. PATENT DOCUMENTS

| | | | |
|---|---|---|---|
| 4,891,060 A | 1/1990 | Overbeek et al. | |
| 5,004,496 A | * 4/1991 | Aune | C21C 5/38 266/148 |

(Continued)

FOREIGN PATENT DOCUMENTS

| | | |
|---|---|---|
| DE | 4203475 A1 | 8/1993 |
| EP | 0508542 A2 | 10/1992 |

OTHER PUBLICATIONS

Great Britain Search Report, GB Application No. 1306976.0, dated Sep. 27, 2013, 3 pages.

(Continued)

*Primary Examiner* — George Wyszomierski
*Assistant Examiner* — Tima M McGuthry Banks
(74) *Attorney, Agent, or Firm* — Senniger Powers LLP (57) ABSTRACT

A process for treating an off-gas from the thermal processing of a precious-metal-containing feedstock, the process comprising cooling the off-gas to a temperature of from 300 to 500° C.; passing the cooled off-gas through a first particulate filter to recover particulate material; and dosing the off-gas from the first particulate filter with a sorbent material and passing the dosed off-gas through a second particulate filter; wherein at least a portion of the particulate material recovered from the first particulate filter is recycled into the thermal processing of the precious-metal-containing feedstock.

20 Claims, 3 Drawing Sheets

(51) Int. Cl.
  *C22B 7/02* (2006.01)
  *B01D 53/64* (2006.01)
  *C22B 11/00* (2006.01)

(56) References Cited

U.S. PATENT DOCUMENTS 5,413,621 A * 5/1995 Hogner ............... B01D 53/70
                                                       75/10.36

6,117,207 A       9/2000  Miserlis
2005/0247162 A1  11/2005  Bratina
2011/0220554 A1   9/2011  Thomas et al.
2011/0274580 A1  11/2011  Deegan et al.
2014/0026713 A1   1/2014  Bezuidenhout et al.

OTHER PUBLICATIONS

International Search Report and Written Opinion, PCT/GB2014/051197, dated Sep. 3, 2014, 8 pages.

* cited by examiner

PRECIOUS METAL RECOVERY

FIELD OF THE INVENTION

The present invention relates generally to the field of extractive metallurgy, more particularly to a process, product and apparatus relating to the recovery of platinum-group-metals (PGMs) and other high-value metals hereinafter referred to as precious metals. That is, the present invention relates to a method for improving the yield of a precious metal recovery process. In particular, the process focuses on improvements to the off-gas treatment system to provide a commercially viable approach to increasing the technical metal recovery yield of the process.

BACKGROUND

In the recovery of precious metals (such as PGMs), every fraction of a percentage improvement in the technical metal recovery efficiency (amount of PGM recovered as a percentage of PGM input processed) has a profound impact on the commercial performance and competitiveness of the process. This is because the operators pay considerable amounts for the 'waste' in the first place, the margins are modest and the working capital requirements and risks are high.

GB2465603 discloses a plasma assisted PGM recovery process. The technical metal recovery efficiency for a system as described in GB2465603 is high compared to other competing technologies. Single pass recovery efficiencies of around 98% w/w have been achieved. Furthermore, the technology disclosed in this application offers an advantage in that the configuration of the plasma based heating system leads to lower physical and chemical carryover of dust into the off-gas abatement system and, therefore, lower losses of PGMs.

In order to meet the required environmental compliance targets, the off-gas stream from the thermal process must be contained and treated prior to discharge. This includes dosing with sorbents in a dry scrubber (a high temperature ceramic filter). The combined action of the sorbent and filter captures airborne pollutants, such as a fly ash and salt by-products produced during scrubbing (sulphates, oxides, chlorides). The design disclosed in GB2465603 allows for simultaneous gas cleaning and particulate removal in a single filtration unit.

U.S. Pat. No. 4,295,881 discloses a process for the recovery of PGMs from chromite based ores that is reliant on high intensity smelting operations described in U.S. Pat. No. 4,685,963. U.S. Pat. No. 4,295,881 states that the process off-gas can be passed through a baghouse to recover airborne dust. This dust can then be treated by conventional lead blast furnace practice.

SUMMARY OF THE INVENTION

Accordingly, it is desirable to achieve an improved technical yield and/or tackle at least some of the problems associated with the prior art or, at least, to provide a commercially useful alternative thereto.

In a first aspect the present disclosure provides a process for treating an off-gas from the thermal processing of a precious-metal-containing feedstock, the process comprising:

cooling the off-gas to a temperature of from 300 to 500° C.;

passing the cooled off-gas through a first particulate filter to recover particulate material; and dosing the off-gas from the first particulate filter with a sorbent material and passing the dosed off-gas through a second particulate filter;

wherein particulate material recovered from the first particulate filter is recycled into the thermal processing of the precious-metal-containing feedstock.

DETAILED DESCRIPTION OF PREFERRED EMBODIMENTS

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The present inventors have realised that an appreciable amount of precious metals is carried off into the off-gas system. Indeed, even the low carryover process of GB2465603 still creates a low level of off-gas dust/fly ash containing up to 1 wt % of the total PGM content of the fed input. For example, in the method of U.S. Pat. No. 4,295,881, both the particulate carryover levels and metal losses will be high. Internal recycling in this process is also inhibited due to the accumulation of pollutants.

The inventors have realised that these PGMs may be recovered by capturing the fly ash and recycling it back to the original thermal process as at least a portion of feedstock. However, the intermixing of the PGM containing fly ash with the sorbent materials was found to dilute the PGM and inhibit internal recycling due to active pollutant concentration mechanisms. Therefore, a method was developed to separate and recycle the off-gas dust/fly ash carried over with the off-gas without additional contamination or dilution of the PGM whilst ensuring operational compliance.

Figure 1:
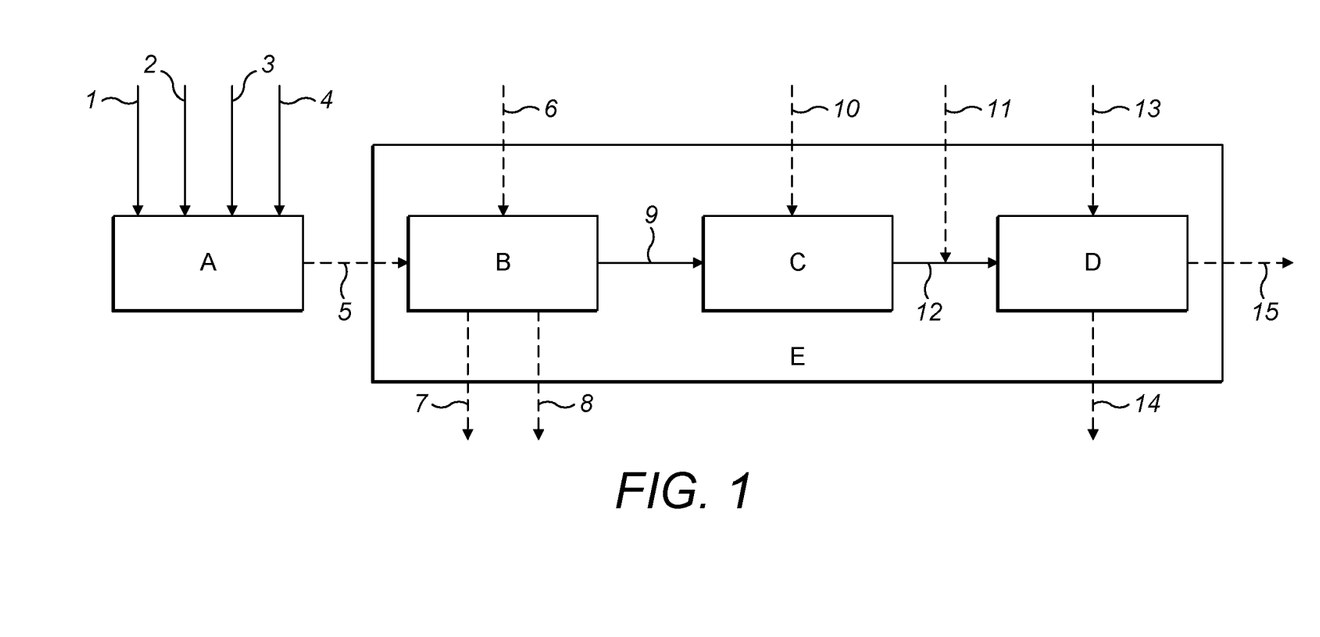
FIG. 1 shows a schematic drawing of a simplified embodiment of the overall process.

The solution proposed is illustrated in FIG. 1. The first filter allows particulate removal without addition of any sorbent based reagents and hence enables internal recycling of PGM containing material. The second filter introduces a suitable sorbent to treat the particulate-free off-gas containing acidic gases to ensure atmospheric emission limits are not exceeded. Therefore, in addition to improving the technical PGM recovery efficiency, the availability of two filtration systems provides an added safety measure in maintaining environmental compliance.

The main advantage of this solution is that it improves the technical recovery efficiency of PGMs to 99% or more, with associated beneficial impacts on process revenue. Further advantages include the removal of the fly ash prior to dry scrubbing, which reduces the particulate loading for the second filter. This in turn increases the cleaning efficiency of the sorbent, therefore reducing emissions further and also reducing the mass of secondary waste. Reducing the particulate loading for each filter by splitting the filtration stage in this way will also prolong the operational life of the ceramic filter elements with reduced maintenance requirements. Removing the fly ash prior to sorbent addition will improve mass accountability and enable more accurate process optimisation.

By an "off-gas" it is meant the gas and gas-entrained components that exhaust from a thermal process whilst treating a precious-metal-containing feedstock. The gaseous components may include hydrogen, carbon monoxide, carbon dioxide, and/or acid gases such as sulphur dioxide. There may also be entrained organic molecules as well as fine dust particles, including fly ash.

By "thermal processing" it is meant any process that involves the use of heat to process precious-metal containing material for the recovery of the precious-metals therefrom. It includes, for example, the treatment of ore and mine tailings and also the treatment of wastes. Suitable techniques are well known in the art and include the method disclosed in GB2465603 and the prior art techniques mentioned therein. GB2465603 is incorporated herein by reference in its entirety.

Precious metals include gold and silver as well as PGMs, which include ruthenium, rhodium, palladium, osmium, iridium and platinum. That is, platinum-group-metals are a subset of precious metals. It should be noted however, that the abbreviation PGM has been used throughout the specification as a synonymous term for precious metals. The process of the invention is capable of concentrating single metals or combinations of two or more thereof as an alloyed product. Whilst the description hereafter refers to precious metals and platinum-group-metals throughout, it would be understood by one skilled in that art that the process could be used to recover any of the above metals from a feedstock.

Preferably the precious-metal-containing feedstock comprises one or more of an autocatalyst, a chemical catalyst, a petrochemical catalyst, a pharmaceutical catalyst, electrical and electronic equipment waste, thermal barrier coating waste, foundry sweeps, electroplating and/or metal finishing waste, jewelry and/or jewelry process waste and dental and/or medical waste.

In order to maximise the efficiency of the process, careful selection of complementary mixes of feedstock, for example, complementary catalyst types, can preferably be selected. The selection and blending may be performed for a number of reasons, including, for example, providing a more homogeneous feedstock. Waste with higher concentrations of PGMs, particularly autocatalysts, are preferred for higher technical metal yields and lower operational costs per troy ounce recovered.

Due to the nature of the thermal processing the off-gases will be at an elevated temperature of at least 800° C. The present method includes a first step of cooling the off-gas to a temperature of 300 to 500° C., more preferably from 350 to 450° C. and most preferably about 400° C. The cooling is required to encourage dropout of particulates from the off-gas and to avoid degradation of the ceramic filters.

The step of cooling may be active or passive. That is, the off-gas may be cooled with a heat exchanger to actively cool the off-gas. Alternatively the off-gas may be passed through sufficient ducting, or allowed to expand to reduce the temperature passively. In one preferred embodiment the step of cooling includes the off-gas being at least partially cooled by the addition of air. The addition of air advantageously causes a change in the off-gas velocity and encourages drop-out, while at the same time having a cooling effect and maintaining a suitable gas-flow profile for the filtration units. Preferably the step of cooling the off-gas comprises changing the velocity of the off-gas to cause particulate matter to deposit from the gaseous components of the off-gas stream.

The method further comprises passing the cooled off-gas through a first particulate filter to recover particulate material. The first filtration stage occurs before sorbent addition. The first filter is preferably a high temperature ceramic filter to maximise particulate capture. The filter dust collected in the first filter can generally contain up to 3 wt %, but typically 1 wt % of the, total PGM fed into the furnace (depending on the factors affecting particulate carryover such as extent of negative pressure in furnace, gas flows, chemical makeup of the catalyst etc.). However, these PGMs will be only part of the carried over dust mass.

The inventors discovered that it was possible to tailor the duct length or residence time between the thermal oxidiser and first filtration unit to achieve a balance between having insufficient time for agglomeration of nanometric particles to occur and avoid excess cooling. If the duct length or residence time is too long, it will cool the gas excessively and therefore the optimum temperature for off-gas scrubbing, with a dry sorbent, in the second filter will not be met.

Agglomeration increases the effective particle size of the dust. Without the aid of this phenomenon, nanometric particles, which have a very high surface energy, will adsorb onto the filter surface and block/blind the filter pores in a short period of time. This can result in very large filter element pressure drops which can in turn lead to operational instability of the overall process.

Preferably the step of cooling the off-gas is controlled to allow at least a portion of any liquid and solid components of the off-gas to form agglomerates.

Preferably the particulate material recovered from the first particulate filter has a mean longest diameter of from 1 to 10 microns, more preferably from 2 to 8 microns. The particle sizes can be measured using Scanning Electron Microscopy (SEM) and other such techniques which are well known in the art.

The off-gas from the first particulate filter is then dosed with a sorbent material. Suitable sorbent materials are well known in the art and include lime and sodium bicarbonate or other alternative depending on off-gas composition and scrubbing temperature. Preferably the sorbent material is lime and/or sodium bicarbonate because they are readily available cost-effective basic sorbent materials.

The dosed off-gas is then passed through a second particulate filter equipped for dry scrubbing of the off-gas and to ensure environmentally compliant operation. The dust collected in this second filtration stage contains mainly the spent and unused sorbent and thus has low intrinsic value and is suitable for disposal. The spent/unused sorbent mixture may be recycled within this second filtration stage to maximise the use of virgin material. The absence of fly ash particulates and the like from the process is a further advantage as sorbent recycling is more efficient. Different sorbent materials of the same composition may have varying surface areas, and therefore using a product with higher specific surface activity will assist in further improving this second filtration process.

Preferably the first and/or second particulate filters are ceramic filters. Ceramic filters are known for use as particle filters. They are especially suitable for use in the present process due to their ability to work at high temperatures (required for gas cleaning) and pressures (required for a higher gas through-put). Alternatively, as a less preferred alternative, the filters can be metallic filters.

The particulate material recovered from the first particulate filter is recycled into the thermal processing of the precious-metal-containing feedstock. The inventors have discovered that if recycling was enabled without sequential filtration, contamination of the feed stream with spent sorbent (containing sulphides and volatile salts) would occur. This would in turn lead to concentration of these pollutants within the process and exceedance of compliance thresholds as the working capacity limits of the scrubbing facilities are approached.

In one embodiment the recovered PGM containing material from the first filtration stage is collected in a drum directly underneath the filter, preferably using an online cleaning mechanism, e.g. reverse jet pulsing. Once full, the drum is replaced with an empty one and the collected material can be directly blended with the feed material without disrupting plant operation.

Preferably the thermal processing is plasma treatment, preferably at a temperature of 1200° C. to 1600° C. Preferably the plasma treatment is performed in a furnace with a plasma torch.

Preferably the thermal processing of a precious-metal-containing feedstock comprises the steps of:

heating a precious-metal-containing material in a plasma furnace at a temperature of from 1200° C. to 1600° C. to form a precious-metal-rich metal layer, and recovering and refining the precious-metal-rich metal layer to obtain one or more precious metals.

Preferably the process comprises passing the off-gas from the thermal processing of a precious-metal-containing feedstock through a thermal oxidiser to combust any combustible components of the off-gas before the step of cooling the off-gas to a temperature of from 300 to 500° C. Preferably the off-gas is cooled to a temperature of about 400° C. The use of a thermal oxidiser helps to remove reactive and/or organic components from the off-gas.

Preferably the process further comprising recovering particulate material from the thermal oxidiser and/or during the step of cooling the off-gas, and recycling it back into the thermal processing of the precious-metal-containing feedstock.

Preferably the process further involves treating at least a portion of the particulate material recovered from the first particulate material to extract one or more volatile metals. Preferably the one or more volatile metals comprises rhenium. After extracting the one or more volatile metals, the remainder is preferably recycled back into the thermal processing process to concentrate the remaining precious metals.

That is, the inventors have found that the same configuration of filtration equipment can be used for the recovery of volatile but valuable metal species. Examples of which would be zinc and lead, often found as contaminants in wastes, but also valuable metals such as rhenium. Rhenium is likely to be present when treating platinum and rhenium catalysts, such as those used in the alloy of reforming catalysts, olefin metathesis catalysts and hydrogenation catalysts. During thermal treatment in oxidising conditions the rhenium oxidises and the resulting oxide sublimes and partitions to the off-gas phase. For such a feedstock material the Pt/Re catalyst would first be smelted (thermally processed) in a conventional manner (under reducing conditions) to recover the platinum as a ferroalloy whilst retaining the Re within the slag/metal phase. The produced slag would then be re-processed using the same equipment, in accordance with the present method, preferably under oxidising plasma conditions to encourage the partitioning of Re to the gas phase as an oxide for recovery as a dust/particulate phase rich in $Re_2O_7$ for concentration and capture at the first filter. Rhenium(VII) oxide and perrhenic acid ($Re_2O_7(OH_2)_2$) are known to readily dissolve in water, so that they are leached from flue dusts and extracted by precipitating with potassium or ammonium chloride as the perrhenate salts, and purified by recrystallisation.

The inventors have found that the recovery rate of the precious metals from the precious-metal-containing feedstock using the method discussed herein is at least 99 wt %.

In FIG. 1, the labels are as follows:
i. A—Formulation and blending
ii. B—Plasma furnace
iii. C—Thermal Oxidiser
iv. D—Filtration
v. E—Sub-process for mass balance
vi. 1—Autocatalyst
vii. 2—Flux
viii. 3—Collector metal
ix. 4—Reductant
x. 5—Blended Feed
xi. 6—Plasma gas
xii. 7—Slag
xiii. 8—Metal
xiv. 9—Off-gas+fly ash
xv. 10—Combustion air
xvi. 11—Dilution Air
xvii. 12—Combusted off-gas+fly ash
xviii. 13—Sorbent
xix. 14—Particulate drop out
xx. 15—Clean off-gas to stack In FIG. 3, the labels are as follows:
i. 20—Blender
ii. 21—Auto catalyst 246.7 kg/h
iii. 22—Flux (CaO) 27.1 kg/h
iv. 23—$Fe_3O_4$ 16.4 kg/h
v. 24—Carbon 8.5 kg/h
vi. 25—IBC with a feed rate of 298.6 kg/h
vii. 26—Loss-in-weight hopper 298.6 kg/h
viii. 30—Power Supply 439.0 kW
ix. 31—Torch loss 55.0 kW
x. 32—Furnace loss 150.0 kW
xi. 33—Conveyor loss 172.7 kW
xii. 34—Spout loss 15.6 kW
xiii. 35—Off-gas loss 1.8 kW
xiv. 36—Combustion heat 39.5 kW
xv. 37—Slag bin loss 4.8 kW
xvi. 40—Argon 26.3 kg/h
xvii. 41—Plasma furnace 1600° C.
xviii. 42—Metal 16.7 kg/h
xix. 43—Pouring spout 1450° C.
xx. 44—Slag conveyor
xxi. 45—Slag 264.0 kg/h
xxii. 46—Off-gas from furnace
xxiii. 50—Thermal Oxidiser 1100° C.
xxiv. 51—Compressed air
xxv. 52—Post thermal oxidiser gas 161.1 kg/h, 850° C.
xxvi. 53—Dilution air 207.8 kg/h, 20° C.
xxvii. 54—Cooled gas 368.9 kg/h, 380° C.
xxviii. 55—Gas 365.9 kg/h, 280° C.
xxix. 56—Sorbent dosing 1.54 kg/h
xxx. 57—$1^{st}$ filter particulates 2.997 kg/h
xxxi. 58—To Plasma Furnace
xxxii. 59—$2^{nd}$ Filter particulates 2.106 kg/h xxxiii. 60—Cold gas 365.9 kg/h, 180° C.
xxxiv. 61—ID Fan
xxxv. 62—Exhaust
xxxvi. 70—Sequential Filtration System The off-gas exits the furnace through the furnace exit duct and enters a thermal oxidiser (TO) where the off-gas is completely combusted. The combusted off-gas then exits the thermal oxidiser and reaches the filtration system (FLT).

Figure 3:
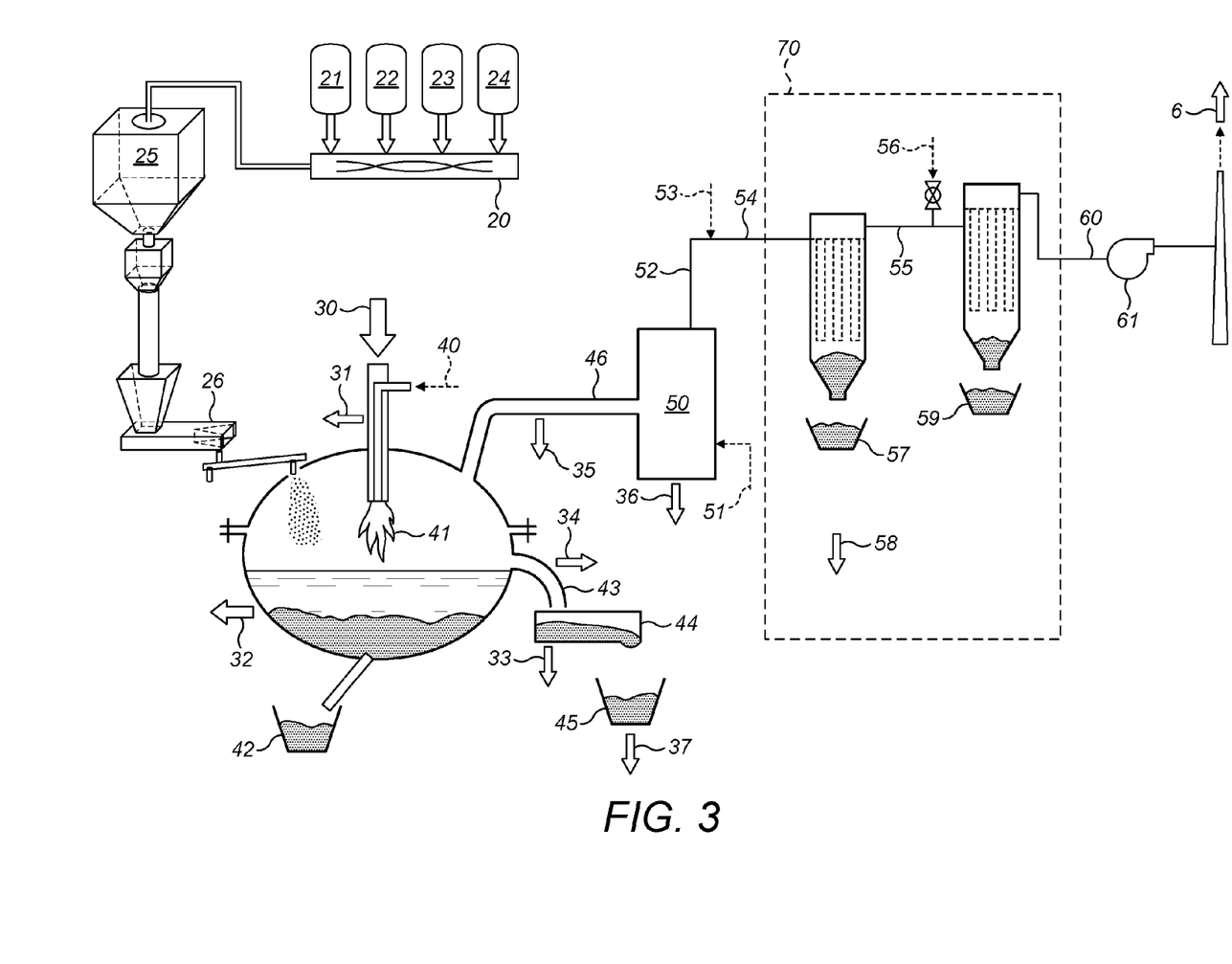
FIG. 3 shows a process flow diagram for a plasma enhanced precious metal recovery system with sequential filtration and recycling steps.

A certain proportion of particles that exit the furnace will drop out in the TO while the remainder will deposit in the FLT. As the furnace off-gas enters the TO the gas velocity reduces, allowing the larger particles to drop out into a catchpot underneath. A T-piece duct is fitted at the exit of the TO, and this change in direction of the gas flow enables further drop out. This is evidenced by the build-up of solid particles at this duct section which is rodded out 1-2 times a day while the process is running as a matter of routine operation. Secondary air is introduced at the TO exit to cool the gas from 850° C. to 400° C. This temperature reduction occurs in the duct between the TO and FLT (TO-FLT duct) and results in condensation of volatile species such as metal oxides and chlorides.

It has been found that the particles that reach the FLT from the furnace exit are due to:
1. Physical carryover of the finer fraction of particles that exit the furnace
2. Condensation of volatile metal oxides due to temperature reduction downstream of the thermal oxidiser.

To confirm this theory the dust collected in the interconnecting TO-FLT duct was analysed. The samples were analysed for composition (using X-ray Fluorescence or XRF) and particle size and microstructure (using SEM) and the results are presented in below:

TABLE 1

Chemical composition of dust in TO-FLT duct using XRF

| Compounds | Wt % |
|---|---|
| $Na_2O$ | 0.952 |
| $MgO$ | 4.803 |
| $Al_2O_3$ | 16.131 |
| $SiO_2$ | 24.591 |
| $P_2O_5$ | 4.670 |
| $K_2O$ | 2.950 |
| $CaO$ | 5.869 |
| $TiO_2$ | 0.000 |
| $Mn_3O_4/MnO$ | 0.241 |
| $Cr_2O_3$ | 0.129 |
| $Fe_2O_3$ | 3.933 |
| $ZrO_2$ | 5.070 |
| $ZnO$ | 8.982 |
| $BaO/Ba$ | 2.376 |
| $La_2O_3/La$ | 0.000 |
| $CeO_2/Ce$ | 9.207 |
| C | 0.044 |
| $S/SO_3$ | 0.746 |
| PGM | 0.310 |
| $Pb/PbO$ | 4.404 |
| Fe | 0.000 |
| $Fe_3O_4$ | 0.000 |
| $CaCO_3$ | 0.000 |
| NiO | 4.076 |
| $Nd_2O_3$ | 0.330 |
| $HfO_2$ | 0.185 |
| Total | 100.00 |

The crude PGM concentration of the dust, as determined by XRF, was 0.3 wt % which is similar in order to the PGM concentration in the feed material. This may suggest physical carryover of the feed material. However, concentrations of volatile metal oxides such as ZnO and PbO have increased compared to the feed material which suggests chemical carryover also. Therefore, without wishing to be bound by theory, it appears that a combination of both physical and chemical carryover takes place.

Figure 2:
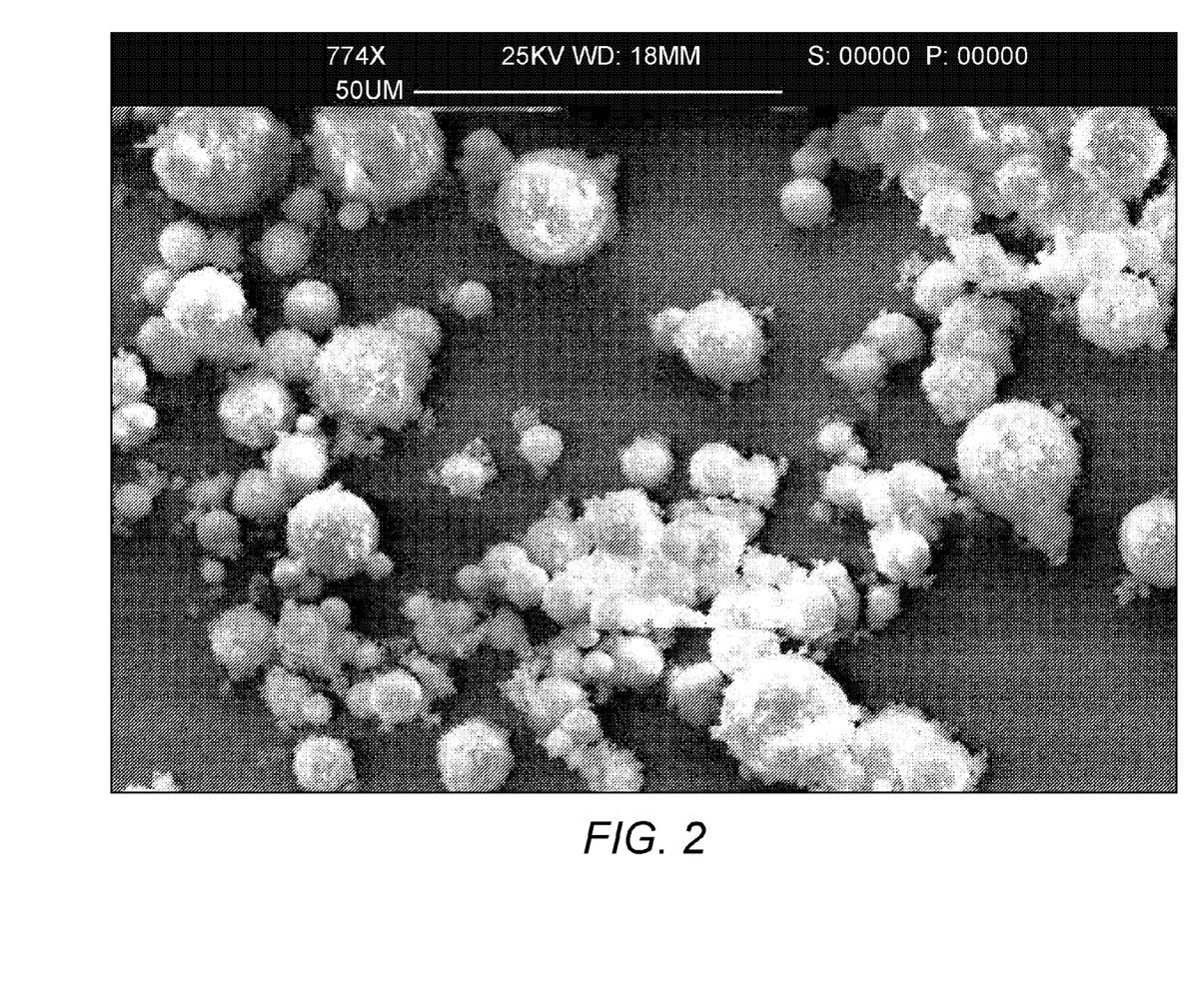
FIG. 2 shows an SEM image of dust collected from the duct between the Thermal Oxidiser and the first Filter.

The SEM images provide further insight to the carryover mechanisms. A large fraction of the particles appear to be spherical in shape with particle diameters ranging from 10 micron to less than 1 micron. There is also evidence of agglomeration of these particles to form larger particle clusters. Formation of spherical particles suggests that some of the feed material is first liquefied under the intense heat of the plasma. The liquid phase then will take the most stable form with the least surface energy i.e. a sphere. The agglomerated spheres seem to be covered with a finer fraction of dust particles. These dust particles are most likely a result of condensation of volatilized species. The surface of the spherical particles may act as nucleation sites for condensation to occur. As such, there appears to be a bimodal particle size distribution due to the presence of two main types of particles, namely, agglomerated spherical particles and finer particles formed by vapour phase condensation.

The invention will now be described in relation to the following non-limiting examples.

Example

In a most preferred embodiment, the present invention uses two ceramic filter units in series to enable increased recovery of PGMs from the plasma assisted process outlined in British patent GB2465603. The particulates removed in the first filter are recycled back into the process as an alternative feedstock (or at least a portion of the feedstock) to recover PGMs carried over with the off-gas stream. This section demonstrates the improvement in PGM recovery as a result of sequential filtration with recycling.

Technical Recovery Efficiency for Process without Sequential Filtration and Recycling Without sequential filtration, the particulates removed from the single filtration system cannot be internally recycled into the system. For the single filtration process where the off-gas dust is not recycled internally, the technical recovery efficiency for an equivalent process can be calculated as shown in Equations 1 and 2.

Recovery efficiency (slag depletion calculation)   Equation 1

$$\text{Technical recovery efficiency} = 100 \times \left(1 - \frac{PGM_{overflowslag} + PGM_{offgasdust}}{PGM_{feed}}\right)$$

Recovery efficiency (metal enrichment calculation)   Equation 2

$$\text{Technical recovery efficiency} = 100 \times \left(\frac{PGM_{metal}}{PGM_{feed}}\right)$$

The subscripts 'feed', 'metal', 'overflow slag' and 'off-gas dust' refer to the component within which the masses of the respective PGMs are measured.

Equation 1 is termed the "slag depletion calculation" as it is based on the total PGM that does not report to the collector metal i.e. the total PGM entrained in the overflow slag and off-gas carryover. In contrast, Equation 2 is termed the "metal enrichment calculation" as it is based on the total PGM that reports to the metal phase at an increased concentration. This is determined by further refining the metal alloy to extract the recovered PGMs. This latter process can take several weeks or months to determine and therefore it is generally accepted to use the slag depletion calculation to determine the technical recovery efficiency of PGM. However, both equations are presented here for clarification.

Technical Recovery Efficiency for Process with Sequential Filtration and Recycling Ceramic filter units have very high particulate removal efficiencies (typically 99.9%) and therefore it is assumed that all the particulates carried over with the off-gas are recycled back to the furnace. As such, Equations 1 and 2 are modified such that the PGM partitioning is calculated with respect to the net PGM input to the system. This is shown in Equation 3 and Equation 4—the improved slag depletion and metal enrichment calculations respectively:

Improved recovery efficiency (slag depletion calculation)   Equation 3

$$\text{Technical recovery efficiency} = 100 \times \left(1 - \frac{PGM_{overflowslag}}{PGM_{feed} - PGM_{offgasdust}}\right)$$

Improved recovery efficiency (metal enrichment calculation)   Equation 4

$$\text{Technical recovery efficiency} = 100 \times \left(\frac{PGM_{metal}}{PGM_{feed} - PGM_{offgasdust}}\right)$$

In both these cases, the subscript 'off-gas dust' refers to all dust collected before the second filtration stage (i.e. does not contain spent/unused sorbent).

The following section provides a worked example demonstrating the improved recovery of PGMs by implementing a sequential filtration system as disclosed herein.

The block diagram of FIG. 1 indicates a "sub-process" around which a mass balance is conducted as part of this worked example. This sub-process consists of only the plasma furnace, thermal oxidiser and filtration system. Input and output streams to/from this sub-process are indicated by the dashed arrows.

The block diagram in FIG. 1 was used to generate the mass balance as shown in Table 2. Streams within the sub-process (e.g. off-gas and fly ash streams) need not be included for the mass balance.

TABLE 1

Mass balance for sub-process comprising of plasma furnace, thermal oxidizer and filtration system

| Input Streams | Mass flow rate, kg/h | Output Streams | Mass flow rate, kg/h |
|---|---|---|---|
| Furnace | | Furnace | |
| Spent autocatalyst | 246.7 | Slag | 264.0 |
| Flux (CaO) | 27.1 | Metal | 16.7 |
| Collector metal (Fe3O4) | 16.4 | | |
| Reductant (C) | 8.5 | | |
| Plasma gas (Ar) | 26.3 | | |
| Thermal Oxidiser and Duct | | Thermal oxidiser and Duct | |
| Combustion air | 107.0 | No outputs from sub-process | N/A |

TABLE 1-continued

Mass balance for sub-process comprising of plasma furnace, thermal oxidizer and filtration system

| Input Streams | Mass flow rate, kg/h | Output Streams | Mass flow rate, kg/h |
|---|---|---|---|
| Thermal management air | 234.1 | | |
| Filtration | | Filtration | |
| Sorbent | 1.5 | Spent/unused sorbent | 2.1 |
| | | Particulate drop out | 3.0 |
| | | Clean off gas to stack | 381.8 |
| Total inputs | 667.64 | Total outputs | 667.64 |

TABLE 2

PGM mass balance for sub-process comprising of plasma furnace, thermal oxidizer and filtration system

| Input Streams | PGM Mass flow rate, kg/h | Output Streams | PGM Mass flow rate, kg/h |
|---|---|---|---|
| Furnace | | Furnace | |
| Spent autocatalyst | 0.5440 | Slag | 0.0054 |
| Flux (CaO) | | Metal | 0.5331 |
| Collector metal (Fe3O4) | | | |
| Reductant (C) | N/A | | |
| Plasma gas (Ar) | | | |
| Thermal Oxidiser and Duct | | Thermal oxidiser and Duct | |
| Combustion air | N/A | No outputs from sub-process | N/A |
| Thermal management air | | | |
| Filtration | | Filtration | |
| Sorbent | N/A | Spent/unused sorbent | 0.0000 |
| | | Particulate drop out | 0.0054 |
| | | Clean off gas to stack | 0.0000 |
| Total inputs | 0.5440 | Total outputs | 0.5440 |

Using these figures in Equations 1 to 4, the technical recovery efficiency for the process with and without recycling of particulates can be calculated. The results are presented in Table 3. By recycling the particulates, the PGM recovery is improved by approximately 1%.

TABLE 3

Technical recovery efficiency with and without recycling of particulates

| | Equation # | Method of Calculation | Technical recovery efficiency, % |
|---|---|---|---|
| Without recycling of particulates | Equation 1 | Slag depletion | 98.0 |
| | Equation 2 | Metal enrichment | 98.0 |
| With recycling of particulates | Equation 3 | Slag depletion | 99.0 |
| | Equation 4 | Metal enrichment | 99.0 |

Although preferred embodiments of the invention have been described herein in detail, it will be understood by those skilled in the art that variations may be made thereto without departing from the scope of the invention or of the appended claims.

The invention claimed is:

1. A process for treating an off-gas from the thermal processing of a precious-metal-containing feedstock, the process comprising:

cooling the off-gas to a temperature of from 300 to 500° C., passing the cooled off-gas through a first particulate filter to recover particulate material; and dosing the off-gas from the first particulate filter with a sorbent material and passing the dosed off-gas through a second particulate filter;

wherein at least a portion of the particulate material recovered from the first particulate filter is recycled into the thermal processing of the precious-metal-containing feedstock.

2. The process according to claim 1, wherein the precious-metal-containing feedstock comprises one or more of an autocatalyst, a chemical catalyst, a petrochemical catalyst, a pharmaceutical catalyst, electrical and electronic equipment waste, thermal barrier coating waste, foundry sweeps, electroplating and/or metal finishing waste, jewelry and/or jewelry process waste and dental and/or medical waste.

3. The process according to claim 1 wherein the thermal processing is plasma treatment at a temperature of 1200° C. to 1600° C.

4. The process according to claim 3, wherein the plasma treatment is performed in a furnace with a plasma torch.

5. The process according to claim 1 wherein the first and/or second particulate filters are ceramic filters.

6. The process according to claim 1, wherein the sorbent material is lime and/or sodium bicarbonate.

7. The process according to claim 1, the process further comprising passing the off-gas from the thermal processing of a precious-metal-containing feedstock through a thermal oxidizer to combust any combustible components of the off-gas before the step of cooling the off-gas to a temperature of from 300 to 500° C.

8. The process according to claim 1, wherein the step of cooling the off-gas is to a temperature of about 400° C.

9. The process according to claim 1, wherein the step of cooling the off-gas is at least partially by adding air.

10. The process according to claim 1 comprising the following thermal processing steps to produce the off-gas of the precious-metal-containing feedstock:

heating a precious-metal-containing feedstock in a plasma furnace at a temperature of from 1200° C. to 1600° C. to form a precious-metal-rich metal layer, and recovering and refining the precious-metal-rich metal layer to obtain one or more precious metals.

11. The process according to claim 1, the process further comprising recovering particulate material deposited in a thermal oxidizer and/or during the step of cooling the off-gas, and recycling it back into the thermal processing of the precious-metal-containing feedstock.

12. The process according to claim 11, wherein a recovery rate of the precious metals from the precious-metal-containing feedstock is at least 99 wt %.

13. The process according to claim 1, wherein the step of cooling the off-gas comprises changing a velocity of the off-gas to cause particulate matter to deposit from the off-gas.

14. The process according to claim 1, wherein the step of cooling the off-gas is controlled to allow at least a portion of any liquid and solid components of the off-gas to form agglomerates.

15. The process according to claim 1, wherein the particulate material recovered from the first particulate filter has a mean longest diameter of from 1 to 10 microns.

16. The process according to claim 1, wherein at least a portion of the particulate material recovered from the first particulate material is treated to extract one or more volatile metals.

17. The process according to claim 16, wherein the one or more volatile metals comprises rhenium.

18. The process according to claim 1 wherein the first and/or second particulate filters are ceramic filters, and wherein the sorbent material is lime and/or sodium bicarbonate.

19. The process according to claim 1 wherein the first and/or second particulate filters are ceramic filters, and wherein the sorbent material is lime and/or sodium bicarbonate, the process further comprising passing the off-gas from the thermal processing of the precious-metal-containing feedstock through a thermal oxidizer to combust any combustible components of the off-gas before the step of cooling the off-gas to a temperature of from 300 to 500° C.

20. The process according to claim 19 further comprising recovering particulate material deposited in the thermal oxidizer and/or during the step of cooling the off-gas, and recycling it back into the thermal processing of the precious-metal-containing feedstock.

* * * * *